Nov. 7, 1961    W. M. BYERLEY ET AL    3,007,679
ANTI-VIBRATION STRUCTURE FOR HEAT EXCHANGER TUBES
Filed June 22, 1960
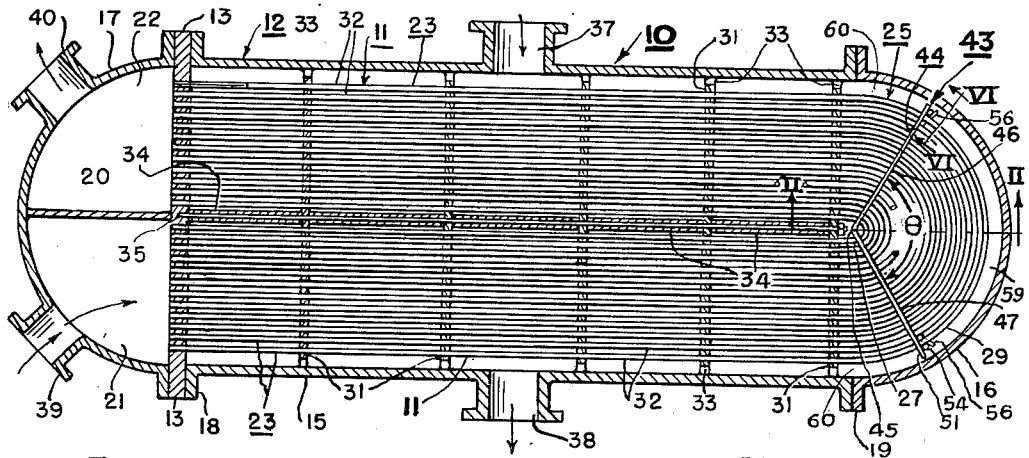
FIG. 1.
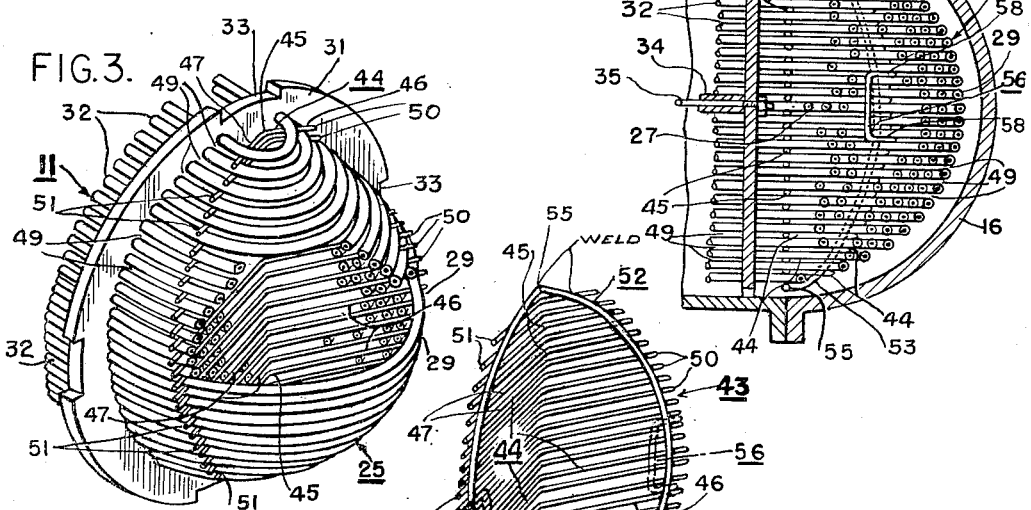
FIG. 2.
FIG. 3.
FIG. 4.
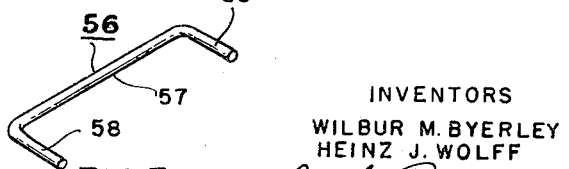
FIG. 6.
FIG. 5.
INVENTORS
WILBUR M. BYERLEY
HEINZ J. WOLFF

United States Patent Office 3,007,679
Patented Nov. 7, 1961

3,007,679
ANTI-VIBRATION STRUCTURE FOR HEAT EXCHANGER TUBES
Wilbur M. Byerley, Ridley Park, and Heinz J. Wolff, Oreland, Pa., assignors to Westinghouse Electric Corporation, East Pittsburgh, Pa., a corporation of Pennsylvania
Filed June 22, 1960, Ser. No. 37,915
7 Claims. (Cl. 257—239)

This invention relates to a structure for supporting and preventing vibration between tubes of a heat exchanger, more particularly between the U-shaped portions of hairpin type tubes, and has for an object to provide a highly improved, yet simplified structure of this type.

A further object of the invention is to provide an anti-vibration support structure for heat exchanger hairpin tubes which may be easily applied to and removed from the tubes with a minimum expenditure in time and effort.

Briefly, the invention provides an anti-vibration support structure for a bundle of heat exchanger hairpin type tubes disposed in spaced layers and having U-shaped portions concentrically arranged in each layer. The support structure comprises a plurality of spacer members of elongated V-shaped disposed between adjacent layers of the tubes with their apical portions disposed adjacent innermost U-shaped portions in the bundle and their end portions extending beyond the outermost U-shaped tube portions. An open frame structure of arcuate shape, conforming to the hemispherical contour of the end portion of the tube bundle, is disposed in juxtaposition with the outermost U-shaped tube portions and is connected to each of the projecting ends of the spacer members by welding, brazing or the like, at their points of crossing.

The thus integrated frame and spacer structure is locked to the tube bundle by one or more U-shaped clip members disposed chordwise of the frame structure and confining therebetween a plurality of the outermost U-shaped tube portions. The clip members are preferably provided with end portions extending through the spaces in the outermost tube bundles and are connected to the frame structure, in any suitable manner, such as welding, brazing or the like, at their points of crossing.

The above anti-vibration support structure may be preformed and assembled as a unitary device which may be applied to the tube bundle by slidably inserting the spacer members between adjacent layers of the U-shaped end portions and then locked in position by applying the locking clips thereto. However, the preferred method of assembly is as follows: first, the spacer members are individually slid into position, the frame structure is then applied with its elongated arcuate portions disposed in abutment with the end portions of the spacers, the locking clips are subsequently inserted with their end portions in abutment with the frame structure, and then the entire assembly may be integrated by welding or brazing the elements to each other at their points of crossing.

The spacers are preferably formed of rod material of circular cross section to facilitate insertion. With this arrangement, the contact between the spacers and their associated U-shaped tube portions is only point contact, so that the spacers may be made of sufficiently large cross section to be snugly received in the spaces between the tube layers with reasonable manual effort.

The foregoing and other objects are effected by the invention as will be apparent from the following description and claims taken in connection with the accompanying drawing, forming a part of this application, in which:

FIG. 1 is an axial sectional view of a hairpin type tube heat exchanger having anti-vibration support structure incorporated therewith in accordance with the invention;

FIG. 2 is a partial sectional view taken on line II—II of FIG. 1;

FIG. 3 is a perspective view of the end portion of the tube bundle with some portions of the anti-vibration support structure removed;

FIG. 4 is a perspective view of the anti-vibration support structure;

FIG. 5 is a perspective view, on a larger scale, of one of the locking clips; and FIG. 6 is an enlarged fragmentary view taken on line VI—VI of FIG. 1 and showing the arrangement for locking the support structure to the tube bundle.

Referring to the drawing in detail, in FIG. 1 there is shown a heat exchanger, generally indicated 10, incorporating the invention. The heat exchanger, as illustrated, is of generally conventional type and includes a bundle 11 of hairpin type tubes disposed within a shell structure generally indicated 12. One end of the tube bundle 11 is supported by a tube sheet 13, which sheet is provided with a plurality of apertures within which the ends of the tube bundle are inserted, as well known in the art. The shell structure 12 includes an elongated cylindrical portion 15 and a pair of oppositely disposed end closure members 16 and 17 of hemispherical shape connected to the cylindrical portion by annular flanged connections 18 and 19. The closure member 17 is provided with an internal partition 20 dividing the former into an inlet chamber 21 and an outlet chamber 22.

The tube bundle 11 includes a plurality of hairpin type tubes 23 which, as shown in FIG. 1, are disposed in parallel layers with their U-shaped portions 25 concentrically arranged, so that the innermost U-shaped tube portions 27 are of relatively small radius and the outermost U-shaped tube portions 29 are of relatively large radius, with the remaining intermediate U-shaped tube portions of progressively graduated radius of curvature disposed therebetween. Since the tube bundle 11 conforms to the cylindrical shape of the shell portion 15, more tubes are provided in the central layers, and the layers above and below the central layers have a gradually decreasing number of tubes, as shown in FIG. 2. Accordingly, the outermost U-shaped tube portions jointly define a generally hemispherical shape, as best shown in FIG. 3.

The tube bundle 11 is further provided with a plurality of transverse partition members 31 disposed in longitudinally spaced relation with each other and having the straight portions 32 of the tubes extending therethrough, thereby to maintain the tubes in fixed spaced relationship with each other throughout their lengths. The partition members 31 are provided with peripheral apertures 33 to permit fluid flow therethrough, and the partition members 31 are held in spaced relation with each other by a plurality of spacer sleeves 34 disposed between adjacent partition members 31 and held therein by an elongated stud 35 extending through the sleeves.

The cylindrical shell portion 15 is provided with a fluid inlet 37 and a fluid outlet 38, while the end member 17 is provided with a fluid inlet 39 and a fluid outlet 40.

The heat exchanger structure thus far described is of the substantially conventional two-pass type and operates in the following manner: a relatively hot fluid such as steam or the like is admitted into the heat exchanger by the fluid inlet 37 and then flows through the apertures 33 in the partition members 31 to fill the entire chamber with the hot fluid. The fluid then flows transversely over the outer surfaces of the tubes 23, heating the same in transit, and is subsequently ejected through the fluid outlet 38.

A fluid at a lower value than the hot fluid, for example, water, is admitted through the inlet 39 into chamber 21 and from there flows through half of the straight portions 32 of the hairpin tubes of the U-shaped portions 25, and from the U-shaped portions through the remaining straight portions 32 of the tubes to chamber 22, from whence it is ejected through the fluid outlet 40. During flow through the tubes, the water absorbs heat from the steam. Accordingly, the steam is substantially cooled and/or condensed by the time it is exhausted through the outlet 38, while the water ejected through the fluid outlet 40 is at a higher temperature than the incoming water.

Conversely, hot liquid may be admitted through the inlet 39 to the tubes 23 and exhausted through the outlet 40, while water is passed across the outside surfaces of the tubes and converted to steam by absorption of heat from the hot liquid.

The U-shaped end portions 25 of the tubes are supported only at diametrically opposed portions by the adjacent partition member 31 and their free end portions are free to vibrate due to effects of the fluid flowing therethrough on the one hand, and fluid flowing thereabout on the other hand, as well as mechanical vibrations. These vibrations can be harmful to the tubes, since they are relatively light in structure and easily damaged.

In accordance with the invention, there is provided anti-vibration support structure generally designated 43 for supporting and minimizing vibration of the U-shaped tube portions 25. This support structure includes a plurality of spacer members or rods 44 of elongated V-shape having an apical or median portion 45 and a pair of divergent leg portions 46 and 47. The spacer members 44 are snugly disposed in the spaces 49 formed by neighboring layers of the U-shaped tube portions and are so disposed that their apical portions 45 are in alignment with each other and disposed adjacent to the innermost U-shaped tube portions 27, as best shown in FIG. 2. The leg portions 46 and 47 are of sufficient length to extend outwardly beyond the outermost U-shaped tube portions 29. However, all of the legs are disposed at an equal angle of divergence $\theta$ (FIG. 1), so that the legs 46 have their outermost end portions 50 disposed in a row and, similarly, the outermost end portions 51 of the legs 47 are disposed in a row. Accordingly, as best shown in FIGS. 3 and 4, the leg portions 46 and 47 of the spacer members 44 are of greatest length adjacent the longitudinal axis of the heat exchanger 10 (FIG. 1) and of diminishing length relative to each other in upward and downward direction relative thereto.

A ring-like or open frame member 52, having a pair of arcuate portions 53 and 54 disposed in spaced relation to each other an amount equal to the spacing between the end portions 50 and 51 of the spacer members, is disposed in abutment with the outer surfaces of the outermost U-shaped tube portions 29. The frame portions 53 and 54 lie in intersecting planes disposed at an angle substantially equal to angle $\theta$ and are joined at their points of intersection 55. Thus, the frame member 52 conforms to the hemispherical contour of the tube bundle and its arcuate portions 53 and 54 are placed in juxtaposition with the outermost end portions 50 and 51 of the spacer members, after the spacer members are disposed as shown in FIG. 3. Subsequent to such placement, the frame member 52 is connected to the spacer members 44 at each of the points of crossing between the end portions 50 and 51 of the spacer members and the arcuate portions 53 and 54 of the frame structure, thereby providing a unitary structure. This attachment may be effected in any desirable manner, such as, for example, welding, brazing or the like.

The support structure 43 further includes a pair of locking clips 56 for preventing movement of the structure relative to the tube bundle 11. The locking clips 56 as best seen in FIGS. 2, 5 and 6, are preferably U-shaped with a central portion 57 and a pair of end portions 58. The central portion 57 is disposed radially inwardly of the outermost U-shaped tube portions 29 and is of sufficient length to extend past a plurality of the latter, as best seen in FIG. 6. The locking clips 56 are disposed chordwise of the associated frame portions 53 and 54, with their end portions 58 extending therepast and on the sides opposite the spacers 44. The locking clips may be attached to the frame member at their points of crossing, by welding, brazing, or the like, in a manner similar to the attachment of the spacer members 44 to the frame member.

Since each of the V-shaped spacer members 44 extends radially outwardly from the concentric configuration of the U-shaped tube portions 25, each layer of U-shaped tube portions 25 is supported in two places. Although the angle of divergence of the leg portions 46 and 47 is not important, it is desirable to make this angle larger than 90 degrees, so as to impart stability to the U-shaped end portions 25 and divide the latter into three spans including a central span 59 and a pair of opposed spans 60 of substantial length, as shown in FIG. 1.

The spacer members 44 may be made of material of any desirable cross section. However, they are preferably made of rod material having a circular cross section, so that they may be snugly fitted between the layers of tubes without the expenditure of large effort during the insertion process. Since the tubes are of circular cross section and the spacer members are also of circular cross section, the support of the tube layers is effected by point contact instead of line contact. For facility of manufacture, the frame member 52 may also be made of rod material.

It will now be seen that the invention provides an anti-vibration support structure 43 which is readily manufactured of easily obtainable rod material, which rod material need only be cut to the desired length and formed by simple bending fixtures and tools, without the need for precision machining by elaborate machine "set-ups."

Although the support structure 43 has been described above as assembled in situ, the support structure may be fabricated with the frame member 52 and the spacer members 44 connected to each other, to appear as shown in FIG. 4, and then applied to the tube bundle, if desired. Subsequent to application of the thus fabricated assembly, the locking members 56 may be assembled in situ and then connected to the frame member to provide the locking feature.

In service, should it be desired to remove the support structure 43 for any reason, such as repair of a tube or replacement thereof, the support structure 43 may be removed in a simple manner by first severing the locking clips and then sliding the former as a unit (FIG. 4) to the right, when viewed as in FIGS. 1 and 2.

While the invention has been shown in but one form, it will be obvious to those skilled in the art that it is not so limited, but is susceptible of various changes and modifications without departing from the spirit thereof.

What is claimed is:

1. In combination, a plurality of heat exchanger hairpin tubes disposed in spaced layers and having U-shaped portions concentrically arranged in each layer, and an anti-vibration structure for supporting said U-shaped tube portions, said support structure comprising elongated spacer members disposed between adjacent layers of said tubes, said spacer members being of V-shape with their apical portions disposed adjacent the innermost U-shaped tube portions and their end portions extending beyond the outermost U-shaped tube portions, and a frame structure of arcuate shape connected to said spacer members adjacent said end portions.

2. In combination, a plurality of heat exchanger hairpin tubes disposed in spaced layers and having U-shaped portions concentrically arranged in each layer, and an anti-vibration structure for supporting said U-shaped tube portions, said support structure comprising spacer rods of substantially circular cross section snugly disposed between adjacent layers of said tubes, said spacer rods being of V-shape with their apical portions disposed adjacent the innermost U-shaped tube portions and their end portions extending beyond the outermost U-shaped tube portions, a frame structure of arcuate shape extending transversely to said layers and connected to said spacer rods adjacent said end portions, and a locking member embracing at least one of said outermost U-shaped tube portions and connected to said frame structure.

3. In combination, a plurality of heat exchanger hairpin tubes disposed in spaced layers and having U-shaped portions concentrically arranged in each layer, said U-shaped portions including innermost and outermost U-shaped portions, and an anti-vibration structure for supporting said U-shaped tube portions, said support structure comprising elongated spacer members snugly disposed between adjacent layers of said tubes, said spacer members having their median portions disposed adjacent the innermost U-shaped tube portions and their end portions extending beyond the outermost U-shaped tube portions, a frame structure having a pair of elongated arcuate portions disposed transversely to said layers and connected to said spacer members adjacent said end portions, and a pair of clip members connected to said elongated arcuate portions, said clip members extending through a plurality of said layers and locking said spacer members in place.

4. In combination, a bundle of heat exchanger hairpin tubes disposed in spaced layers and having U-shaped portions of different radii of curvature concentrically arranged in each layer, said layers including innermost U-shaped tube portions of small radius of curvature and outermost U-shaped tube portions of larger radius of curvature, said outermost U-shaped tube portions jointly imparting a hemispherical contour to said bundle, and an anti-vibration structure for supporting said U-shaped tube portions, said support structure comprising a plurality of spacer rods disposed between adjacent layers of said tubes, said spacer rods being of V-shape with their apical portions disposed adjacent the innermost U-shaped tube portions and their end portions extending beyond the outermost U-shaped tube portions, a frame structure having a pair of arcuate portions overlying said outermost U-shaped tube portions and connected to each of said spacer rods adjacent said end portions, and a locking member extending chordwise of one of said arcuate portions with at least one of said outermost U-shaped tube portions confined therebetween, said locking member being connected to said one of said arcuate portions.

5. In combination, a bundle of heat exchanger hairpin tubes disposed in spaced layers and having U-shaped portions of different radii of curvature concentrically arranged in each layer, said layers including innermost U-shaped tube portions of small radius of curvature and outermost U-shaped tube portions of larger radius of curvature, said outermost U-shaped tube portions jointly imparting a hemispherical contour to said bundle, and an anti-vibration structure for supporting said U-shaped tube portions, said support structure comprising a plurality of spacer rods of substantially circular cross section snugly disposed between adjacent layers of said tubes, said spacer rods being of V-shape with their apical portions disposed adjacent the innermost U-shaped tube portions and their end portions extending beyond the outermost U-shaped tube portions, a frame structure having a pair of arcuate portions overlying and extending transversely of said outermost U-shaped tube portions, said arcuate portions being connected to each of said spacer rods adjacent said end portions, and a locking member extending chordwise of each of said arcuate portions and connected thereto with at least one of said outermost U-shaped tube portions confined therebetween.

6. In combination, a bundle of heat exchanger hairpin tubes disposed in spaced layers and having U-shaped portions concentrically arranged in each layer, a tube sheet supporting said bundle of tubes at the ends opposite said U-shaped portions, and a unitary anti-vibration structure for supporting said U-shaped tube portions, said structure comprising V-shaped spacer rods snugly disposed between adjacent layers of said tubes, each of said spacer rods having an apical portion and a pair of leg portions diverging therefrom, said apical portions being disposed adjacent the innermost U-shaped tube portions and said leg portions extending beyond the outermost U-shaped tube portions, said leg portions being aligned with each other in two rows, and a frame structure having a pair of arcuate portions, said arcuate portions extending along said rows and connected to each of said leg portions.

7. In combination, a bundle of heat exchanger hairpin tubes disposed in spaced layers and having U-shaped portions concentrically arranged in each layer, a tube sheet supporting said bundle of tubes at the ends opposite said U-shaped portions, and a unitary anti-vibration structure for supporting said U-shaped tube portions, said structure comprising V-shaped spacer rods of circular cross section snugly disposed between adjacent layers of said tubes, each of said spacer rods having an apical portion and a pair of leg portions diverging therefrom, said apical portions being disposed adjacent the innermost U-shaped tube portions and said leg portions extending radially beyond the outermost U-shaped tube portions, said leg portions being aligned with each other in two rows, a frame structure having a pair of arcuate portions, disposed externally of said U-shaped tube portions, said arcuate portions extending along said rows and connected to each of said leg portions at the points of crossing, and a pair of U-shaped locking members extending transversely through a plurality of said layers and connected to asid arcuate portions.

References Cited in the file of this patent

UNITED STATES PATENTS

| | | |
|---|---|---|
| 1,787,448 | Holton et al. | Jan. 6, 1931 |
| 1,894,692 | Kerr et al. | Jan. 17, 1933 |
| 1,967,961 | Metten | July 24, 1934 |
| 2,853,278 | Hesler | Sept. 23, 1958 |